(12) United States Patent
Ma et al.

(10) Patent No.: US 8,447,116 B2
(45) Date of Patent: May 21, 2013

(54) IDENTIFYING TRUE FEATURE MATCHES FOR VISION BASED NAVIGATION

(75) Inventors: Yunqian Ma, Plymouth, MN (US); Shrikant Rao, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 13/188,836

(22) Filed: Jul. 22, 2011

(65) Prior Publication Data

US 2013/0022233 A1 Jan. 24, 2013

(51) Int. Cl.
*G06K 9/66* (2006.01)
*G06K 9/62* (2006.01)

(52) U.S. Cl.
USPC ........................... 382/195; 382/209

(58) Field of Classification Search
None
See application file for complete search history.

(56) References Cited

U.S. PATENT DOCUMENTS

| | | | | |
|---|---|---|---|---|
| 5,835,910 A | * | 11/1998 | Kavanagh et al. | 1/1 |
| 6,067,369 A | * | 5/2000 | Kamei | 382/125 |
| 6,243,492 B1 | * | 6/2001 | Kamei | 382/181 |
| 6,516,099 B1 | * | 2/2003 | Davison et al. | 382/284 |
| 6,597,801 B1 | * | 7/2003 | Cham et al. | 382/103 |
| 6,795,567 B1 | * | 9/2004 | Cham et al. | 382/103 |
| 6,970,591 B1 | * | 11/2005 | Lyons et al. | 382/154 |
| 7,130,454 B1 | * | 10/2006 | Berube et al. | 382/118 |
| 7,177,486 B2 | | 2/2007 | Stewart | |
| 7,489,806 B2 | * | 2/2009 | Mohri et al. | 382/107 |
| 7,630,517 B2 | * | 12/2009 | Mirowski et al. | 382/109 |
| 7,706,603 B2 | | 4/2010 | Najafi | |
| 7,809,722 B2 | * | 10/2010 | Gokturk et al. | 707/736 |
| 8,170,280 B2 | * | 5/2012 | Zhao et al. | 382/103 |
| 8,170,379 B2 | * | 5/2012 | Shiiyama et al. | 382/305 |
| 2009/0213112 A1 | | 8/2009 | Zhu | |

OTHER PUBLICATIONS

McIlroy, "Deterministic sample consensus with multiple match hypotheses", "British Machine Vision Conference", Aug. 31, 2010, Publisher: BMVC.
Nister, "Visual Odometry", "Proceedings of the 2004 IEEE Computer Society Conference on Computer Vision and Pattern Recognition", Jun. 27, 2004, pp. 1-8, vol. 1, Publisher: CVPR, Published in: Washington D.C.

\* cited by examiner

*Primary Examiner* — Manav Seth
(74) *Attorney, Agent, or Firm* — Fogg & Powers LLC

(57) ABSTRACT

An example embodiment includes a method for identifying true feature matches from a plurality of candidate feature matches for vision based navigation. A weight for each of the plurality of candidate feature matches can be set. The method also includes iteratively performing for N iterations: calculating a fundamental matrix for the plurality of candidate feature matches using a weighted estimation that accounts for the weight of each of the plurality of candidate feature matches; calculating a distance from the fundamental matrix for each of the plurality of candidate feature matches; and updating the weight for each of the plurality of candidate feature matches as a function of the distance for the respective candidate feature match. After N iterations candidate feature matches having a distance less than a distance threshold can be selected as true feature matches.

20 Claims, 7 Drawing Sheets

IDENTIFYING TRUE FEATURE MATCHES FOR VISION BASED NAVIGATION

BACKGROUND

A global navigation satellite system (GNSS), such as the Global Positioning System (GPS), can be used to provide navigation information, e.g., position and velocity measurements for a sensor platform such as a vehicle, robot, or handheld device. When a GNSS is not available, an inertial navigation system (INS) can be used to provide the position and velocity measurements or estimates by using inertial sensors and an integration algorithm. Pure strap down inertial navigation has drift, that is, the errors in estimated position increase with time. A monocular camera can be used as an aiding source to address the drift.

For monocular camera aided navigation a system can extract features from a set of two or more frames (e.g., images) and identify matching features (also referred to herein as "feature matches") in the set. These feature matches can be used to, for example, determine relative motion between the images, identify a moving object in the images, and determine a relative location of two or more cameras with respect to objects in the images.

In image based navigation, a camera associated with (e.g., mounted on) an aircraft or ground vehicle can serve as an aiding sensor for a navigation system (e.g., an inertial navigation system). The camera can track stationary landmarks on the ground and based on a determination of its own motion, an integrated navigation system can estimate where it should see landmarks in the next camera frame. The camera can track features through feature matching between two frames or between a map and a new frame. The locations of matched features can be fed to a Kalman filter along with the position, velocity, and attitudes calculated by the strapdown INS to perform the correction of drift errors mentioned above. The Kalman filter fuses information from the INS and the camera to generate optimal estimates of the state of the sensor platform at each point in time.

SUMMARY

An example embodiment includes a method for identifying true feature matches from a plurality of candidate feature matches for vision based navigation. A weight for each of the plurality of candidate feature matches can be set. The method also includes iteratively performing for N iterations: calculating a fundamental matrix for the plurality of candidate feature matches using a weighted estimation that accounts for the weight of each of the plurality of candidate feature matches; calculating a distance from the fundamental matrix for each of the plurality of candidate feature matches; and updating the weight for each of the plurality of candidate feature matches as a function of the distance for the respective candidate feature match. After N iterations candidate feature matches having a distance less than a distance threshold can be selected as true feature matches.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
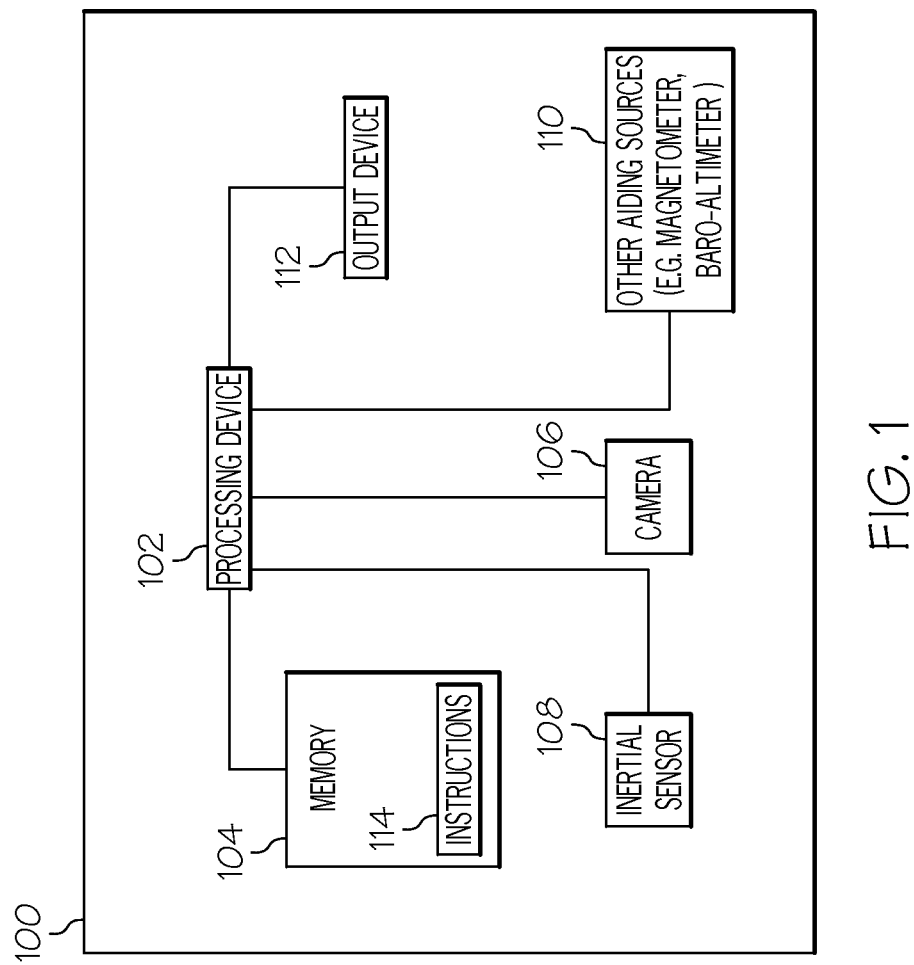
FIG. 1 is a block diagram of an example vision based navigation system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of an example vision based navigation system 100. In this example, the navigation system 100 is configured as an image based navigation system. The navigation system 100 can include one or more processing devices 102 coupled to one or more memory devices 104. The navigation system 100 can also include one or more cameras 106 coupled to the one or more processing devices 102 and configured to capture frames (e.g., images) and provide the frames to the one or more processing devices 102. The navigation system 100 can include one or more inertial sensors 108 (e.g., gyroscope, accelerometer, etc.) coupled to the one or more processing devices 102 and configured to sense inertial movement and provide data indicative of the inertial movement to the one or more processing devices 102. The navigation system 100 can also include one or more aiding sources 110 (e.g., altimeter, magnetometer, satellite navigation system receiver, range finder, etc.) coupled to the one or more processing devices 102 and configured to provide navigation data to the one or more processing devices 102. In some examples, the navigation system 100 can include one or more output devices 112 (e.g., port, display device, speaker, etc.) coupled to the one or more processing devices 102 and configured to provide data to a user or another system.

The one or more processing devices 102 can include a central processing unit (CPU), microcontroller, microprocessor, field programmable gate array (FPGA), application specific integrated circuit (ASIC) and other processing devices. The one or more processing devices 102 and the vision based navigation system 100 can be "configured" to perform certain acts when the one or more memory devices 104 include instructions 114 which, when executed by the one or more processing devices 102, cause the one or more processing devices 102 to perform those acts. These instructions can implement the functions of the vision based navigation system 100 as described herein. These instructions can be stored on any appropriate processor-readable medium used for storage of processor-readable instructions and/or data structures. This processor-readable medium can include the one or more memory devices 104 and/or other suitable media. Suitable processor readable media can include tangible media such as magnetic or optical media. For example, tangible media can include a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link.

In an example, the navigation system 100 can be implemented in an aircraft (e.g., plane, jet, helicopter, etc.), spacecraft, land vehicle (e.g., rover), water vehicle, or other entity (e.g., missile). These entities can include autonomous, semi-autonomous, or human piloted aircraft, spacecraft, land vehicle, water vehicle, or other entity.

The following description may refer to the one or more processing devices 102, the one or more memory devices 104, the one or more cameras 106, the one or more inertial sensors 108, one or more aiding sources 110, and the one or more output devices 112 in the singular form (e.g., the processing device 102); however, it should be understood that in many cases the singular form is used for simplicity and that use of the singular form may be not intended to limit these components to a single component (e.g., a single processing device 102) unless otherwise specified. Accordingly, although the singular form is used, it should be understood that in many cases one or more of the particular components can be used as indicated above.

The instructions 114 can be used in the processing unit 102 to perform a sequence of operations over a plurality of time steps. The processing unit 102 can acquire data from various sensors (e.g., inertial sensor 108, camera 106, and aiding source 110). The processing unit 102 can apply a strapdown navigation algorithm to the inertial measurements and apply image processing algorithms to the frames acquired from the camera 106. The processing unit 102 can fuse the strapdown algorithm output with the image feature data and the measurements from the aiding sources 110 to generate estimates of the state of the sensor platform. This state can include the three-dimensional (3D) position, velocity, and attitudes. The output of the processing unit 102 is the navigation solution (e.g., the state of the sensor platform).

Figure 2A:
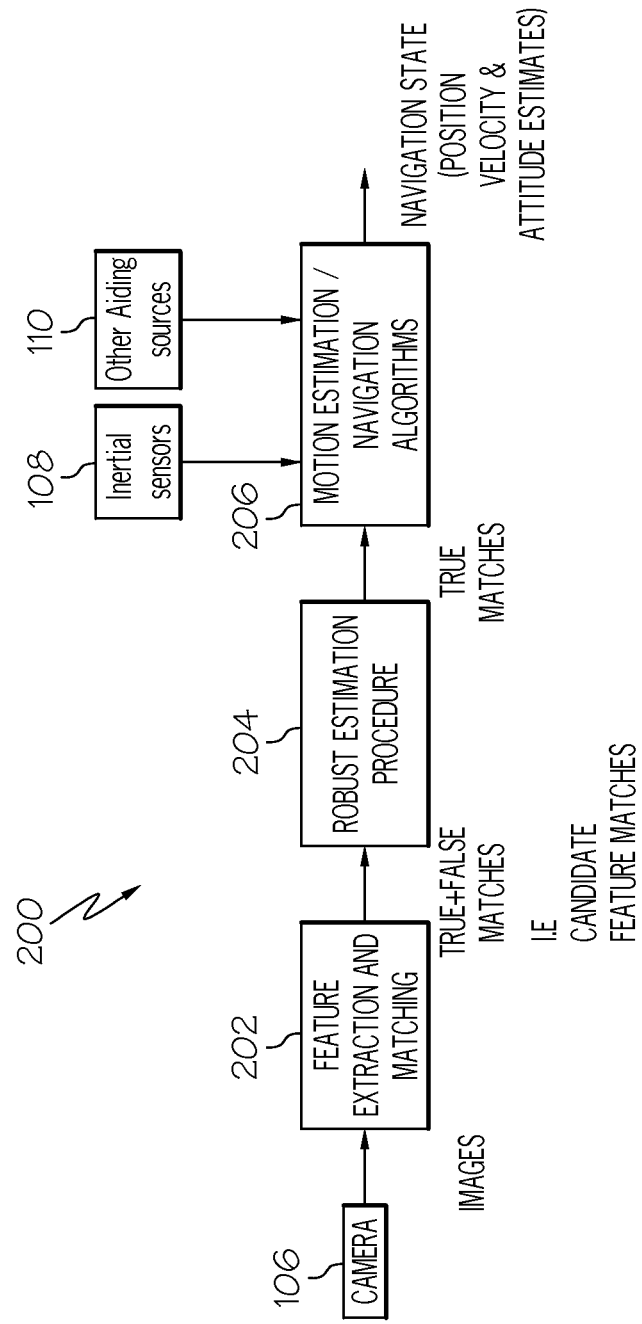
FIG. 2A is a flow diagram of an example method for vision based navigation for which the navigation system of FIG. 1 can be configured to perform.

FIG. 2A is a flow diagram of an example method 200 for vision based navigation for which the navigation system 100 can be configured to perform. Method 200 is an algorithmic functionality that can be implemented by the instructions 114 when executed on the processing device 102 to achieve vision based navigation. The method 200 can include receiving a plurality of frames (e.g., from the camera 106) and processing the plurality of frames to aid in calculation of a navigation solution.

At block 202, a plurality of point features can be extracted from two or more frames. In an example, a 2-D speeded up robust features (SURF) descriptor can be extracted, however, other methods of feature extraction (e.g., scale-invariant feature transform (SIFT)) can also be used. A point feature defines the image projection of a point 212 in 3D space within a field of view of a camera 106.

Figure 2B:
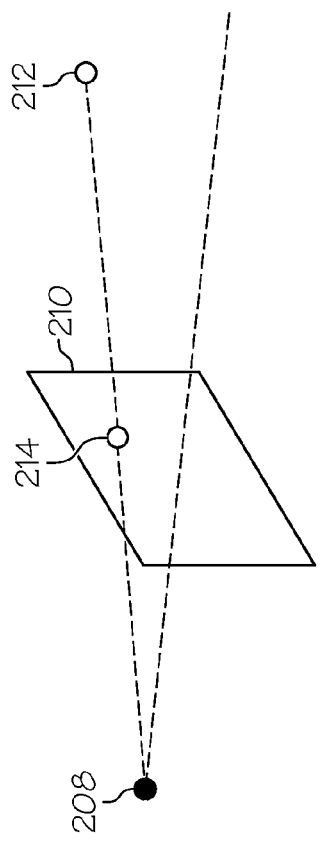
FIGS. 2B and 2C are perspective views of point features on an image relative to a corresponding 3D point in space and a focal point of a camera.

FIG. 2B illustrates such a point feature 214 on an image relative to a corresponding 3D point in space and a focal point of a camera 106. To extract a point feature, a camera 106 having a focal point 208 can initially capture a frame 210 of a 3D space within the field-of-view of the camera 106. A point feature 214 can then be extracted. The point feature 214 defines the image projection of a specific point 212 in the 3D space within the field-of-view of the camera 106. That is, the 2D point feature 214 corresponds to the point 212 in 3D space as projected on the frame 210.

Figure 2C:
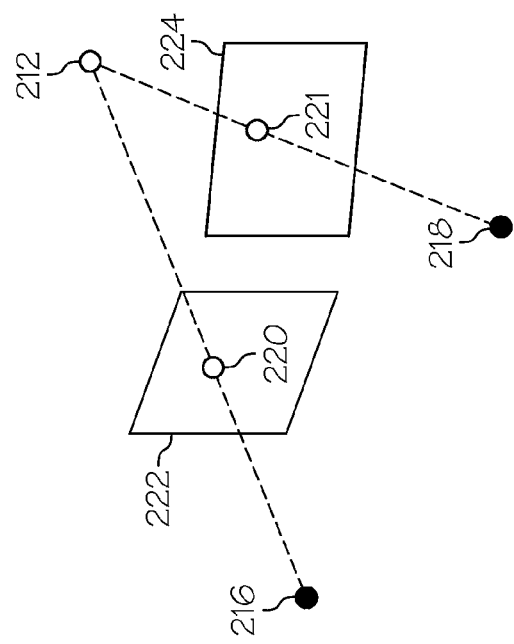

FIG. 2C depicts a pair of frames wherein the camera 106 captures a frame 222, 224 of the same 3D point 212 from each of two different locations 216, 218. The first frame 222 is captured from a first location 216 (e.g., a focal point of the camera 106 at the first location 216), and the second frame 224 is captured from a second location 218. Due to the differing viewpoints between the frames 222, 224, the point 212 is projected onto a different 2D point feature 220, 221 on the two frames. Since feature 220 and feature 221 correspond to the same the 3D point 212 feature 220 and feature 221 are considered to match. Method 200 attempts to identity these matching features and remove any non matched features from candidate feature matches.

At block 202, a plurality of candidate feature matches can be identified between the plurality of features of a first frame and the plurality of features of a second frame. In an example, the plurality of candidate feature matches includes a set of paired features, wherein each pair of features includes one feature from the first frame and one feature from the second frame that have been determined to be a likely match. This initial feature matching, however, is not perfect. As such, the plurality of candidate feature matches includes both actual feature matches as well as non matching features. The non matching features, if used to calculate the navigation related information can result in errors, sometimes large errors, in the navigation related information. Accordingly, the method 200 can be used to attempt to identify the actual feature matches from the plurality of candidate feature matches. The feature matches identified as actual feature matches from the plurality of candidate feature matches are referred to herein as "true feature matches". The feature matches identified as non matching features from the plurality of candidate feature matches are referred to herein as "false feature matches". The true feature matches identified can then be used for computing a navigation solution.

In an example, the plurality of candidate feature matches can be identified based on a Mahalanobis or Euclidean distance between the descriptors of the two SURF features, however, other methods of feature matching can also be used.

As explained below, the plurality of candidate feature matches calculated at block 202 can be processed using the robust estimation procedure of block 204 to identify and remove false matches from the plurality of candidate feature matches, thereby providing a set of true feature matches. This set of true feature matches can be fused with data from other sensors (e.g., inertial sensors 108 and other aiding sources 110) at block 206 to calculate a navigation solution (e.g., the state of the sensor platform including position, velocity, and attitude).

Conventional methods for identifying true feature matches include random sample consensus (RANSAC). RANSAC can perform a series of trials with randomly picked subsets to arrive at a set of true feature matches. It can apply an 8-point algorithm to compute a fundamental matrix that encodes the epipolar constraint between the candidate feature matches.

Each candidate feature match is then scored against the fundamental matrix and the scores are thresholded to find the inliers, that is, the matches that have relationships similar to the fundamental matrix. The trial that has the largest number of inliers is selected as the best and the outliers of this best trial are labeled as false feature matches. The number of trials needed to achieve a high probability of correctly identifying the false feature matches can be quite large.

This large number of trials (e.g., ~500) can result in the RANSAC method having a large computational load, especially when the sample set is large. This large computation load can reduce the ability of the RANSAC method to achieve high frame rates (e.g., in real-time applications). Additionally, the RANSAC method relies on offline camera calibration, which may not be available in certain situations. When a camera is not calibrated, uncorrected distortion errors can be present in the feature data which can cause large errors in the motion estimated by the 8-point algorithm. In turn, these large errors can cause the computation of inliers and score to be erroneous. This can lead to poor performance of the RANSAC algorithm.

Another conventional method for identifying true feature matches includes residual analysis in an extended Kalman filter. In the update step of Kalman filter the errors between the predicted outputs and the measured outputs are used to update the state. In case this error is beyond a threshold decided by a standard statistical test, the measurements are assumed to be spurious, that is, the feature matches generating these measurements are assumed to be false feature matches. This method based on a residual test can have difficulty distinguishing between a false match and a high value for the noise error in the feature measurement.

The performance of these conventional methods is due, in part, to the use of least squares estimation for identifying true feature matches and removing false feature matches.

At block 204, the method 200 uses a robust estimation to identify true feature matches from the plurality of candidate feature matches. By identifying true feature matches, false feature matches are also identified and can be removed. Detail regarding the robust estimation at block 204 is described with respect to FIG. 3 below.

At block 206, the true feature matches are used to calculate a relative angle and/or orientation between the frames. The relative angle and/or orientation can be used to determine a motion estimation between the two frames (e.g., when the frames are captured by a single camera at different times). For example, feature tracks can be formed between successive frames obtained by a single camera 106. The motion estimation can then be used in an extended Kalman filter or simultaneous localization and mapping (SLAM) to aid inertial navigation and generate a navigation solution. The relative angle and/or orientation can also be used to for video-odometry (e.g., when the frames are captured by different cameras). Additional regarding vision based motion navigation with the relative angle and/or orientation is provided below with respect to FIGS. 5 and 6.

Figure 3:
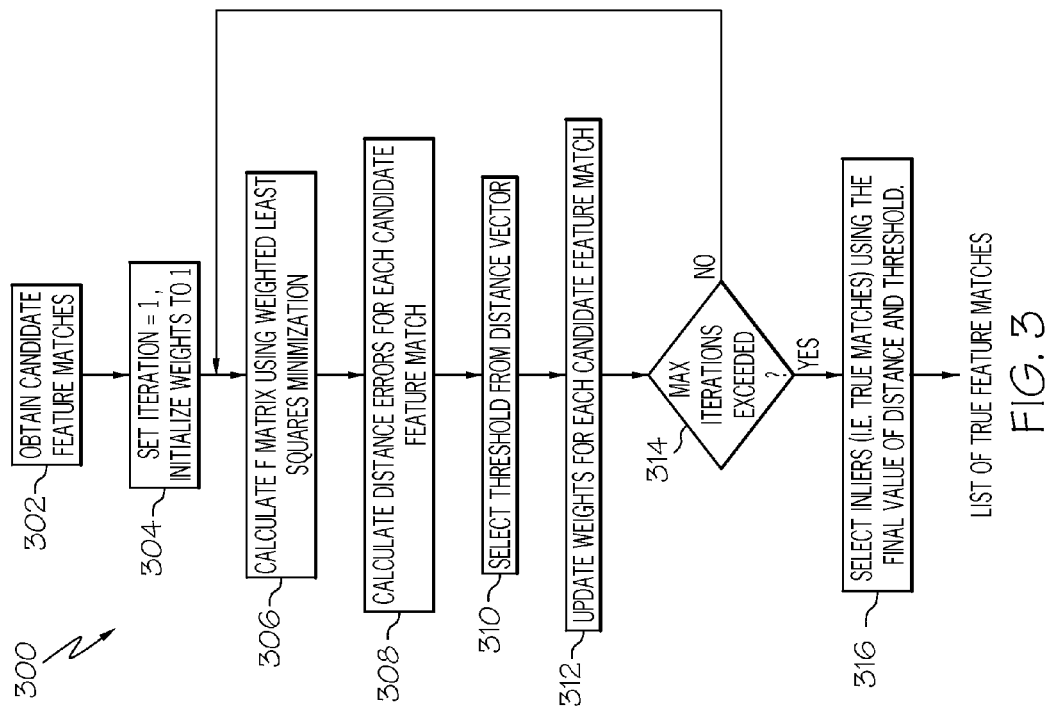
FIG. 3 is a flow diagram of an example method for identifying true feature matches from a plurality of candidate feature matches.

FIG. 3 is a flow diagram of an example method 300 for identifying true feature matches from a plurality of candidate feature matches. Method 300 corresponds to block 204 of the method 200 and provides additional detail on the robust estimation procedure. Method 300 can estimate the fundamental matrix robustly and at the same time identify true feature matches and false feature matches with a few iterations. Each iteration (e.g., blocks 306-314) can optimize an estimator (e.g., a parametric fit at block 306) to the plurality of candidate feature matches by selectively and progressively eliminating candidate feature matches that are not similar enough to the fit by reducing a weight of these candidate features (block 312). The proposed estimator can use a weighted least squares, geometric error minimization algorithm to calculate a fundamental matrix in each iteration (block 306). This fundamental matrix can be used to calculate a distance (e.g., distance error) for each of the candidate feature matches (block 308). The weights for candidate feature matches with large errors can be reduced (block 312) in the iteration. After performing N iterations, most (e.g., all) of the false feature matches (e.g., outliers) should be given a zero or low weight. In an example, method 300 performs 1 to 10 iterations and in some examples 5 or fewer iterations. Method 300 can also be used without calibration of the camera 106.

At block 302, a plurality of candidate feature matches are obtained. As mentioned above, the plurality of candidate feature matches includes both true feature matches and false feature matches. In an example, the plurality of candidate feature matches can be between a plurality of features of a first frame and a plurality of features of a second frame. In another example, the plurality of candidate feature matches can be between a plurality of features of a first frame and a map (e.g., in a SLAM application).

In an example, the plurality of candidate feature matches obtained at block 302 (and used throughout method 300) comprises all the candidate feature matches identified by feature matching (e.g., block 202). In another example, the plurality of candidate feature matches obtained at block 302 comprises a subset (e.g., almost all) of the candidate feature matches identified by feature matching.

At block 304, a weight for each of the plurality candidate feature matches obtained at block 302 can be initialized. In an example, the weight for each of the candidate feature matches is set to the same value (e.g., a value of 1). After block 304, the method 300 can iteratively perform the acts of blocks 306-314. Accordingly, the number of iterations N to be performed on the blocks 306-314 can be initialized at block 304. In an example, an iteration count is initialized to 1 to indicate that this is the first iteration. The iteration count can be incremented each time a new iteration is started. At the end of an iteration (e.g., block 314), the iteration count can be compared to N to determine whether to continue with another iteration or to proceed with block 316 is discussed below.

In an example, an iteration begins at block 306 where a fundamental matrix is calculated using a weighted estimation using the plurality of candidate feature matches. The geometric constraint between the projections p1 and p2 of a 3D point onto two frames is expressed in terms of the fundamental matrix relating the two frames as $$p_2^T F p_1 = 0 \quad (1)$$

where p1 and p2 are the two candidate feature matches (e.g., points) in two frames expressed in homogeneous form, and F is the fundamental matrix relating the two frames.

In an example, the weighted estimation includes a weighted least squares estimation. In the current iteration, the fundamental matrix is estimated using the weights from the previous iteration or from initiation in the case of the first iteration. The following notation can be used:

n: No. of candidate feature matches in the plurality of candidate feature matches F: Fundamental matrix for two frames)

$$F = \begin{bmatrix} f_1 & f_2 & f_3 \\ f_4 & f_5 & f_6 \\ f_7 & f_8 & f_9 \end{bmatrix} \quad (2)$$

$(p_{1i}, p_{2i})$: $i^{th}$ feature pair in frames 1 and 2 expressed in homogenous coordinates $p_{1i}=[p_{1xi}\ p_{1yi}\ p_{1zi}]^T$ $p_{2i}=[p_{2xi}\ p_{2yi}\ p_{2zi}]^T$ $w_i$, $i=1 \ldots n$: Optimal weight used for the $i^{th}$ feature match $w_i$ is computed from F and feature pair $(p_1, p_2)$ as:

$$w_i = \frac{1}{\sqrt{r_{x1}^2 + r_{y1}^2 + r_{x2}^2 + r_{y2}^2}} \quad (3)$$

where $r_{x1} = f_1 p_{2x} + f_4 p_{2y} + f_7 p_{2z}$ $r_{y1} = f_2 p_{2x} + f_5 p_{2y} + f_8 p_{2z}$ $r_{x2} = f_1 p_{1x} + f_2 p_{1y} + f_3 p_{1z}$ $r_{y2} = f_4 p_{1x} + f_5 p_{1y} + f_6 p_{1z}$ (4)

$\gamma_i$, $i=1 \ldots n$: Additional weights assigned to each of the n feature matches by each iteration of method 300

$\frac{S}{d}$

: Subset of the plurality of candidate feature matches.
: Mean of a set of values of distance $\{d_i\}$
$\sigma$: Threshold parameter used in the Robust Loss Function
T1: First distance threshold
T2: Second distance threshold The weight for each candidate feature match can be defined as $w_i$, where $\gamma_i$ can be defined as the multiplier which is used to update the weights (block 312) in each iteration. The combined weight matrix for calculating the fundamental matrix can be $$W = \begin{bmatrix} w_1\gamma_1 & 0 & \ldots & 0 \\ 0 & w_2\gamma_2 & \ldots & 0 \\ \ldots & & & \\ 0 & 0 & \ldots & w_n\gamma_n \end{bmatrix}.$$

Given a weighting matrix as in (5), the fundamental matrix F can be calculated using the weight matrix W in a least squares formulation by first defining the matrix A of dimension n by 9 as $$A = W \begin{bmatrix} p_{2x1}p_{1x1} & p_{2y1}p_{1x1} & p_{2z1}p_{1x1} & p_{2x1}p_{1y1} & p_{2y1}p_{1y1} & p_{2z1}p_{1y1} & p_{2x1}p_{1z1} & p_{2y1}p_{1z1} & p_{2z1}p_{1z1} \\ p_{2x2}p_{1x2} & p_{2y2}p_{1x2} & p_{2z2}p_{1x2} & p_{2x2}p_{1y2} & p_{2y2}p_{1y2} & p_{2z2}p_{1y2} & p_{2x2}p_{1z2} & p_{2y2}p_{1z2} & p_{2z2}p_{1z2} \\ \ldots & & & & & & & & \\ p_{2xn}p_{1xn} & p_{2yn}p_{1xn} & p_{2zn}p_{1xn} & p_{2xn}p_{1yn} & p_{2yn}p_{1yn} & p_{2zn}p_{1yn} & p_{2xn}p_{1zn} & p_{2yn}p_{1zn} & p_{2zn}p_{1zn} \end{bmatrix} \quad (6)$$

The singular value decomposition of A can be obtained by $A=U\Sigma V^T$. The entries of the fundamental matrix F can be obtained as the last column of the matrix V i.e., when V is partitioned as $V=[V_1|V_2|\ldots|V_9]$ (7)

We get the elements of the matrix F as $f_i = V_{9i}, i=1\ldots 9$ (8)

where $f_i$ s are the elements of the 3×3 matrix F as defined in (2) above.

At block 308, a distance from the fundamental matrix is calculated for each of the plurality of candidate feature matches. In an example, the distance comprises a distance error (e.g., a Sampson distance error). The distance for each of the plurality of candidate feature matches can form a set of distances (e.g., a distance vector). For example, from the F matrix above, the Sampson distance errors can be calculated as $d_i = (p_{2i}^T F p_{1i}) w_i$ (9)

where wi is a weight used for the $i^{th}$ feature match that is calculated from F and feature pair $(p_1, p_2)$ as described above.

At block 310, one or more distance thresholds can be selected from the set of distances. The one or more distance thresholds can be used at block 312 to update the weight for each of the plurality of candidate feature matches. Accordingly, the one or more distance thresholds can be used to separate the weights of the true feature matches from the weights of the false feature matches. The one or more distance thresholds can be selected as an intermediate value in the set of distance, for example, one or more distance thresholds can be selected such that most (e.g., all) false feature matches have their weights reduced and most (e.g., all) of the true feature matches have their weight held.

Statistical analysis can be used to select the one or more distance thresholds. In an example, a first distance threshold can be selected as the median or mean value in the set of distances. In another example, a first distance threshold can be selected using a standard deviation based method where the first distance threshold is set at sigma ($\sigma$), the standard deviation. For example, S can be a subset of the candidate feature matches that have a non zero $\gamma i$ and n inliers can be the number of matches in the subset S (e.g., obtained from the previous iteration) then $$\bar{d} = \frac{\sum_{j \in S} d_j}{n_{inliers}} \quad (10)$$

$$\sigma = \frac{\sum_{j \in S}(d_j - \bar{d})^2}{n_{inliers}}.$$

At block 312, the weight for each of the plurality of candidate feature matches can be updated as a function of the distance for the respective candidate feature match. For example, candidate feature matches having a larger distance from the fundamental matrix can have their weights reduced more than candidate feature matches having a smaller distance. In an example, the weights can be updated by progressively reducing the weight of a candidate feature match based on where the distance falls with respect to the standard deviation of the set of distances. For example, a weight of a candidate feature match having a distance greater than the first distance threshold T1 (e.g., sigma in the case of a standard deviation) can be reduced. The weights can also be updated by holding unchanged the weight of a candidate feature match having a distance less than the first distance threshold T1.

In an example, a candidate feature match having a large difference between its distance and the first distance threshold T1 can be set as an outlier by having its weight set to zero. This can be based on a second distance threshold T2. In an example, the second distance threshold T2 can be set to three times the first distance threshold T1, therefore, a candidate feature match having a distance more than three times greater than the first distance threshold T1 can have its weight set to zero. Use of a second distance threshold T2 to set candidate feature matches having a large distance to zero effectively sets these candidate feature matches as false matches (e.g., outliers). In addition, setting these candidate feature matches to zero effectively eliminates these candidate feature matches from calculation of the fundamental matrix in the next iteration. Therefore, the fundamental matrix can (ideally) get more accurate after each iteration. Moreover, reducing the weights of candidate feature matches having distances greater than the first distance threshold T1 has a similar effect of reducing their effect on the fundamental matrix of the next iteration.

In an example, the weights are updated (e.g., reduced, held, set to zero) by multiplying the current weight by a multiplier. For example, to reduce a weight the weight is multiplied by a multiplier that is less than one. Greater reduction in weight can be achieved by using a multiplier closer to zero. A weight can be held by multiplying by one or equivalently by re-using the old weight. A weight can be set to zero by multiplying the weight by zero.

Figure 4:
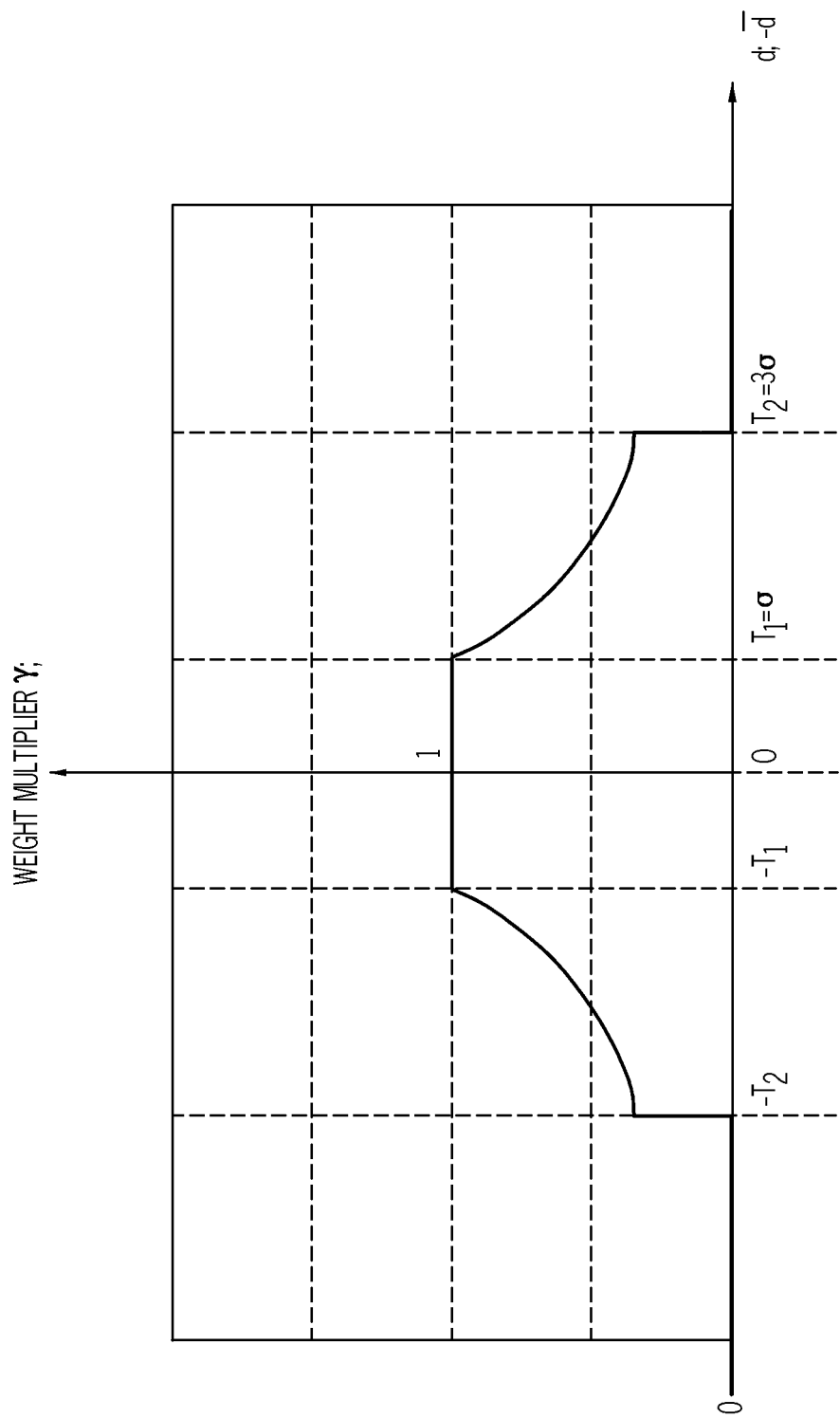
FIG. 4 is a graph of an example weighting function used to update the weight of each candidate feature match.

FIG. 4 is a graph of an example weighting function used to update the weight of each candidate feature match at block 312 in each iteration of method 300. FIG. 4 depicts a robust loss function (e.g., a Huber weighting function) that can be used to update the weight for each of the candidate feature matches.

FIG. 4 illustrates the computation of weight multiplier ($\gamma$) as a function of distance ($d_i - \bar{d}$). As shown, candidate feature matches having a distance less than (e.g., less than or equal to) the first distance threshold T1 (e.g., sigma in a standard deviation) are multiplied by a multiplier ($\gamma$) of 1. Candidate feature matches having a distance between the first distance threshold T1 (e.g., T1=$\sigma$) and the second distance threshold T2 (e.g., T2=3$\sigma$) can have their value progressively reduced by multiplying the weight by a progressively reducing value from first distance threshold T1. Candidate feature matches having a distance greater than the second distance threshold T2 can have their weight set to zero by multiplying the weight by zero. This can be explained in arithmetic as follows, $$\begin{aligned} \text{if} \quad & |d_i - \bar{d}| \le \sigma & \text{then} \quad & \gamma_i = 1 \\ & \sigma < |d_i - \bar{d}| \le 3\sigma & & \gamma_i = \sigma / |d_i - \bar{d}| \\ & |d_i - \bar{d}| > 3\sigma & & \gamma_i = 0. \end{aligned} \quad (11)$$

In other examples, other weighting functions can be used with or without a second threshold T2 at which weights are set to zero. In an example, a linear weighting function is used.

At block 314, the method 300 can determine whether N iterations have been performed. If N iterations have not been performed the method 300 performs another iteration by returning to block 306. If N iterations have been performed the method 300 continues to block 316. In an example, method 300 performs 1 to 10 iterations and in some examples 5 or fewer iterations. As described, in an example the method 300 can perform 1 iteration (e.g., one time through blocks 306-314) and proceed directly to block 316.

The method 300 continues in this manner through N iterations, by calculating a new fundamental matrix estimate based on the updated weights of the previous iteration (block 306). An iteration also re-calculates new distances based on the new fundamental matrix (block 308) and updates the weights based on the new distances. In this manner false feature matches can have their weights reduced (e.g., progressively) toward zero.

After N iterations, at block 316, all candidate feature matches having a distance less than the second distance threshold T2 can be selected as true feature matches (e.g., inliers). These true feature matches can be used in further processing as described with respect to block 206 of method 200. Candidate feature matches having a distance greater than the second distance threshold T2 can be removed (e.g., discarded) as false feature matches.

Figure 5:
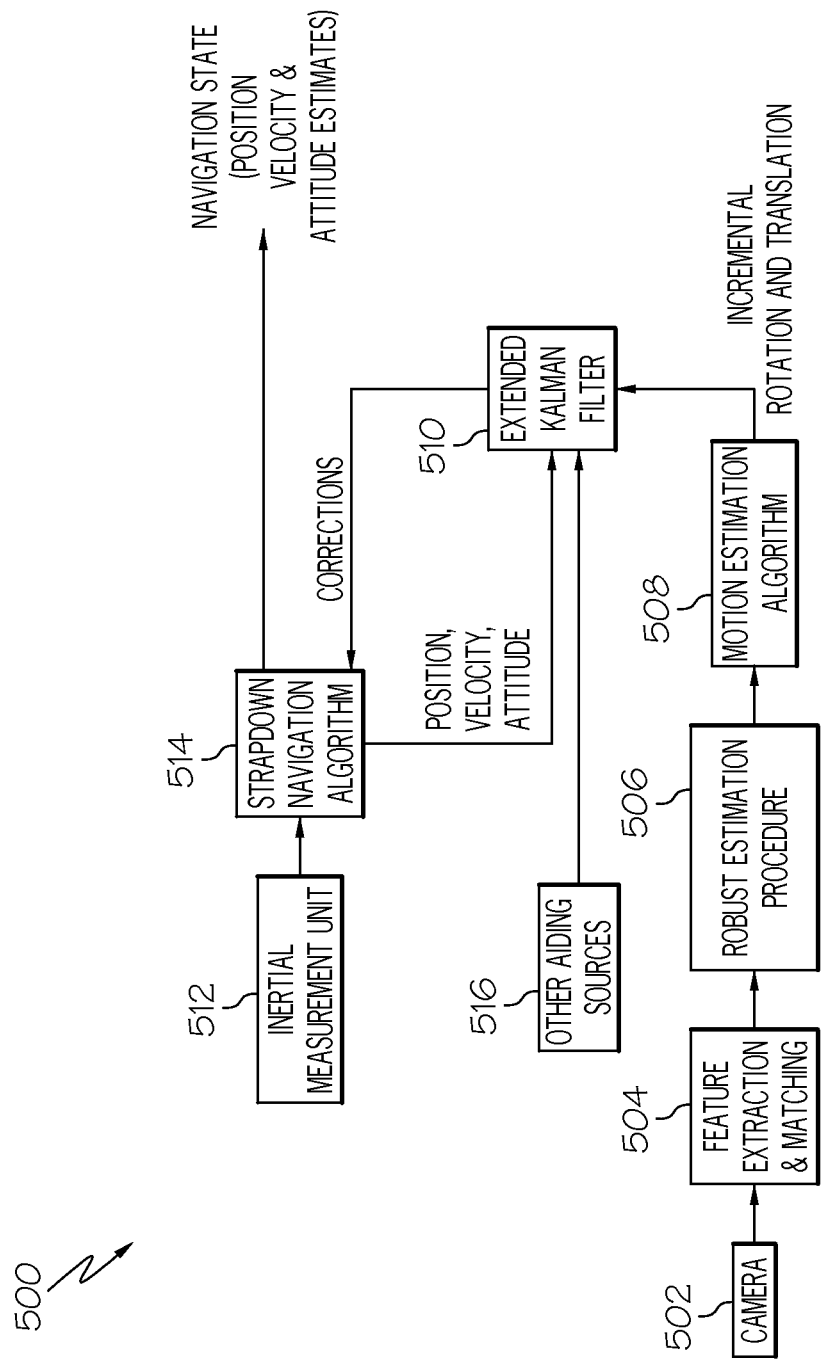
FIG. 5 is a block diagram of an example method for visual odometry based navigation using the true feature matches identified by the method of FIG. 3.

FIG. 5 is a block diagram of an example method 500 for visual odometry based navigation using the true feature matches identified by the robust estimation of method 300. At block 502, one or more frames are captured by a camera 106. At block 504 features can be extracted and matched from these one or more frames as described with respect to block 202 of method 200. At block 506 the robust estimation of method 300 can be used to identify true feature matches. At block 508, motion estimation algorithm can be applied to the true feature matches to generate incremental rotation and translation between the frames. This motion estimation can be input into an extended Kalman filter (block 510).

Additionally, at block 512, an inertial sensor 108 can sense inertial data and a strapdown navigation algorithm 514 can be used to process the outputs of the inertial sensor 108. The outputs of the strapdown algorithm 514, the aiding sensor (516) and the incremental rotation and translations from the motion estimation at block 508 can be fused using an extended Kalman filter at block 510. The extended Kalman filter can provide corrections to the strapdown navigation algorithm 514. These corrections can be applied by the strapdown navigation algorithm 514 to determine the navigation solution (e.g., position, velocity, and attitude).

Figure 6:
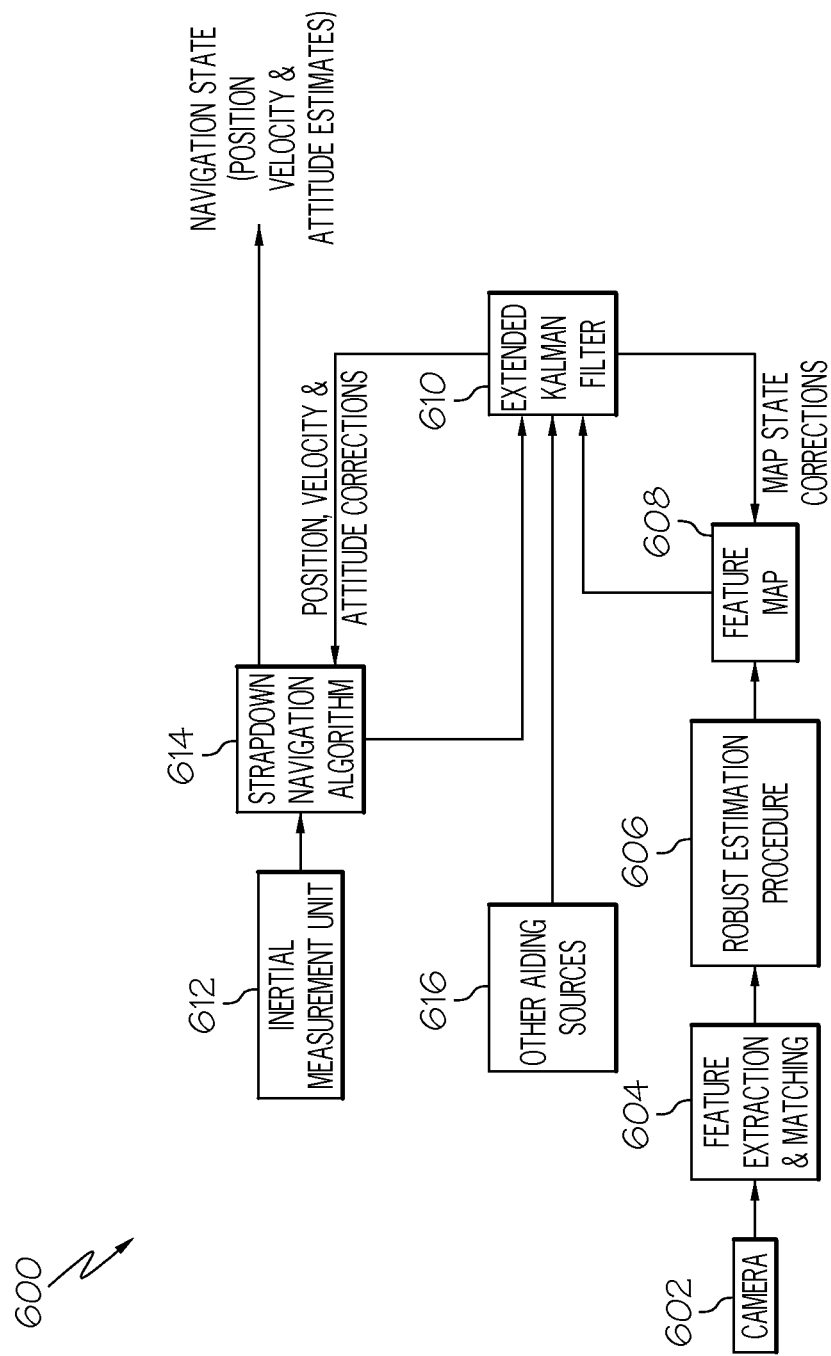
FIG. 6 is a block diagram of an example method for simultaneous localization and mapping (SLAM) using the true feature matches identified by the method of FIG. 3.

FIG. 6 is a block diagram of an example method 600 for simultaneous localization and mapping (SLAM) using the true feature matches identified by the robust estimation of method 300. At block 602, one or more frames can be captured by a camera 106. At block 604 features can be extracted and matched from these one or more frames as described with respect to block 202 of method 200. At block 606 the robust estimation of method 300 can be used to identify true feature matches. At block 608, a feature map can be maintained based on the true feature matches at block 606. The true feature matches corresponding to features in the map can be input to the Kalman filter (block 610).

Additionally, at block 612, an inertial sensor 108 can sense inertial data and a strapdown algorithm 614 can be used to process the outputs of the inertial sensors. The outputs of the strapdown algorithm 614, the other aiding sensor 616 and the coordinates of the true feature matches from the map 608 can be fused using an extended Kalman filter 610. The extended Kalman filter can then provide corrections to the strapdown navigation algorithm 614 and also corrections to the map 608. The corrections sent to the strapdown algorithm 614 can be applied by the strapdown navigation algorithm 614 to determine the navigation solution (e.g., position, velocity, and attitude).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for identifying true feature matches from a plurality of candidate feature matches for vision based navigation, the method comprising:
   setting a weight for each of the plurality of candidate feature matches with a navigation system;
   iteratively performing for N iterations with the navigation system:
   calculating a fundamental matrix for the plurality of candidate feature matches using a weighted estimation that accounts for the weight of each of the plurality of candidate feature matches;
   calculating a distance from the fundamental matrix for each of the plurality of candidate feature matches;
   updating the weight for each of the plurality of candidate feature matches as a function of the distance for the respective candidate feature match; and
   after N iterations selecting as true feature matches, candidate feature matches having a distance less than a distance threshold.

2. The method of claim 1, wherein setting a weight includes setting each weight the same.

3. The method of claim 2, wherein setting a weight includes initializing all weights to 1.

4. The method of claim 1, wherein N is within the range of 1 to 10.

5. The method of claim 1, wherein the weighted estimation includes a weighted least squares, geometric error minimization.

6. The method of claim 1, wherein calculating a distance includes calculating Sampson distance errors with respect to the fundamental matrix for each of the plurality of candidate feature matches.

7. The method of claim 1, wherein updating the weight includes using a robust loss function.

8. The method of claim 1, wherein updating the weight includes progressively reducing the weight of a candidate feature match based on where the distance falls with respect to a standard deviation of the set of distances.

9. The method of claim 8, wherein updating the weight includes reducing the weight of candidate feature matches having a distance greater than sigma, the standard deviation, and holding the weight of candidate feature matches having a distance less than sigma.

10. The method of claim 8, wherein updating the weight includes setting the weight for candidate feature matches having a distance greater than three sigma to zero.

11. The method of claim 1, wherein selecting includes discarding candidate feature matches having a distance error greater than the distance threshold for at the end of iteration N.

12. A device for provide navigation information, the device comprising:
    one or more navigation sensors including at least one camera;
    one or more processing devices coupled to the one or more navigation sensors;
    one or more memory devices coupled to the one or more processing devices, the one or more memory devices including instructions which, when executed by the one or more processing devices cause the one or more processing devices to:
    receive a frame from the at least one camera
    extract a plurality of features from the frame;
    identify a plurality of candidate feature matches between the plurality of features and features of another data set;
    set a weight for each of the plurality of candidate feature matches;
    iteratively perform for N iterations:
    calculate a fundamental matrix for the plurality of candidate feature matches using a weighted estimation that accounts for the weight of each of the plurality of candidate feature matches;
    calculate a distance with respect to the fundamental matrix for each of the plurality of candidate feature matches;
    select a first distance threshold at an intermediate value in a set of the distances corresponding to the plurality of candidate feature matches;
    select a second distance threshold at an intermediate value in a set of the distances corresponding to the plurality of candidate feature matches;
    update the weight for each of the plurality of candidate feature matches as a function of the distance for a respective candidate feature match and the first distance threshold;
    after N iterations select as true feature matches, candidate feature matches having a distance less than the second distance threshold for iteration N; and
    calculate a navigation solution using the true feature matches.

13. The device of claim 12, wherein extract a plurality of features includes using a speed-up robust features (SURF) to extract features.

14. The device of claim 12, wherein identifying a plurality of candidate feature matches includes using one of the Mahalanobis or Euclidean distance between two features to identify a match, and wherein the other data set includes one of another frame or a map.

15. The device of claim 12, wherein calculate a navigation solution includes:
    determining a navigation solution using one of visual odometry or simultaneous localization and mapping (SLAM).

16. The device of claim 12, wherein the first threshold value is one of a mean of the set of distances, a median of the set of distances, and sigma, a standard deviation, for the set of distances.

17. The device of claim 12, wherein N is within the range of 1 to 10.

18. The device of claim 12, wherein update weights includes reducing the weight of candidate feature matches having a distance greater than the first distance threshold, holding the weight of candidate feature matches having a distance less than the first distance threshold, and setting the weight for candidate feature matches having a distance greater than the second distance threshold to zero.

19. A non-transitory processor-readable medium including instructions which, when executed by a processor, cause the processor to:
    set a weight for each of the plurality of candidate feature matches to a first value;
    for N iterations:

calculate a fundamental matrix for the plurality of candidate feature matches using a weighted estimation that accounts for the weight of each of the plurality of candidate feature matches;

calculate a distance error with respect to the fundamental matrix for each of the plurality of candidate feature matches;

select a distance threshold at an intermediate value in a set of the distance errors corresponding to the plurality of candidate feature matches;

reduce the weight of candidate feature matches having a distance error greater than the distance threshold; and after N iterations select as true feature matches, candidate feature matches having a distance error less than the distance threshold for iteration N.

20. The non-transitory processor-readable medium of claim 19, wherein for N iterations includes:

holding the weight of candidate feature matches having a distance error less than the distance threshold, and setting the weight for candidate feature matches having a distance error greater than three times the distance threshold to zero.

\* \* \* \* \*